United States Patent [19]

Davis

[11] Patent Number: 4,652,008

[45] Date of Patent: Mar. 24, 1987

[54] SUSPENSION STRUT AND PIVOT BEARING ASSEMBLY FOR VEHICLE

[75] Inventor: Leo W. Davis, Dallas, Tex.

[73] Assignee: LiquidSpring Investors, Ltd., Dallas, Tex.

[21] Appl. No.: 625,452

[22] Filed: Jun. 28, 1984

[51] Int. Cl.[4] .............................................. B60G 25/00

[52] U.S. Cl. .................................................... 280/672

[58] Field of Search ................ 280/93, 96.1, 660, 672, 280/673, 691, 693; 267/64.11

[56] References Cited

U.S. PATENT DOCUMENTS

| | | | |
|---|---|---|---|
| 2,856,197 | 10/1958 | Allinquant | 280/673 |
| 3,195,878 | 7/1965 | Rosky et al. | 280/673 |
| 3,558,148 | 1/1971 | Johnson | 280/672 |
| 4,030,715 | 6/1977 | Duran | 267/64.11 |

*Primary Examiner*—John J. Love
*Assistant Examiner*—Kenneth R. Rice
*Attorney, Agent, or Firm*—Hubbard, Thurman, Turner & Tucker

[57] ABSTRACT

A compressible fluid type suspension strut is interconnected between a vehicle frame and a steerable wheel spindle support providing spring and shock absorbing functions and serving as a steering bearing support assembly. An arrangement of spherical bearing members and bearing support plates are disposed around the piston rod of the suspension strut and interconnect the rod with a frame support member for transmitting bearing loads during normal operation of the strut and in the event of collapse of the strut whereby the spindle supported by the strut may be steered. The lower end of the suspension strut cylinder is connected to the spindle support body by a self aligning bearing assembly to alleviate bending loads on the strut cylinder. An outer bearing sleeve extends between the spindle body and a frame support member for carrying bending loads imposed on the strut assembly.

15 Claims, 5 Drawing Figures

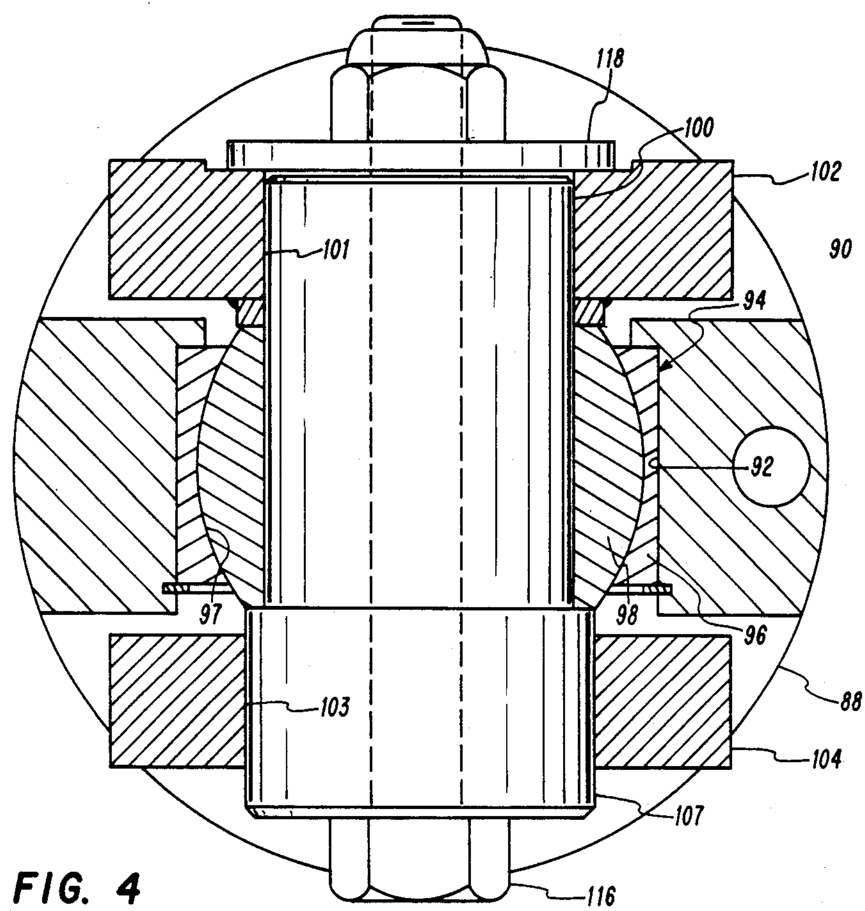
FIG. 4
FIG. 5
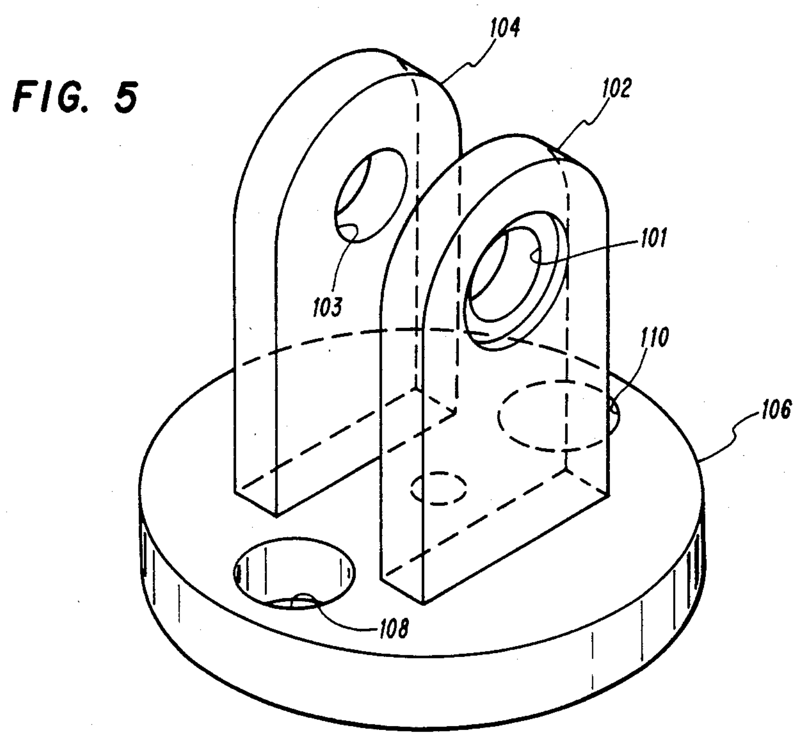

SUSPENSION STRUT AND PIVOT BEARING ASSEMBLY FOR VEHICLE

BACKGROUND OF THE INVENTION

1. Field of the Invention

The present invention pertains to a hydraulic suspension strut for supporting the steering arm and spindle support assembly for a wheeled vehicle wherein the suspension strut has a pivot bearing support arrangement for supporting the strut and the spindle to permit steering movement in the event of collapse of the strut piston and cylinder.

2. Background

In automotive and similar type vehicles, the development of pressure fluid cylinder and piston type suspension struts has been undertaken due to the relative merits of these devices in damping vertical movements of the vehicle undercarriage and, in certain applications, to provide a combination spring and shock absorbing function. It has been determined that it is particularly desirable to utilize a pressure fluid type cylinder and piston suspension strut for a vehicle wherein the strut also comprises the support for a steerable wheel support spindle. However, in the event of failure of a seal or other unwanted collapse of the piston and cylinder of a strut of the type described herein it is particularly important that the steerable spindle be capable of steering function so that the vehicle may be driven under its own power or at least steered easily for transport to a repair facility. The present invention provides a particularly unique suspension arrangement for a steerable spindle of a wheeled vehicle including a hydraulic suspension strut and support bearing means associated therewith.

SUMMARY OF THE INVENTION

The present invention provides a suspension strut and bearing arrangement for a wheeled vehicle or the like wherein a hydraulic cylinder and piston type suspension strut supports a steerable wheel spindle and comprises a suspension spring and spring dampener. In accordance with an important aspect of the present invention the suspension strut is configured to provide for rotation of the wheel spindle support about the longitudinal axis of the suspension strut itself and the suspension strut is provided with bearing means to permit steering of the wheel spindle during normal operation and in event of collapse of the strut cylinder and piston assembly.

In accordance with another aspect of the present invention there is provided an improved suspension strut arrangement for supporting a steerable wheel spindle support or the like wherein support bearings are provided at opposite ends of the suspension strut to accommodate misalignment between the strut and the vehicle frame and between the strut and the wheel spindle support. The suspension strut arrangement also includes a unique elongated bearing sleeve and support housing for supporting the strut and spindle support wherein only axial loads are imposed on the strut.

The above-noted features and advantages of the present invention as well as other superior aspects thereof will be further appreciated by those skilled in the art upon reading the detailed description which follows in conjunction with the drawing.

BRIEF DESCRIPTION OF THE DRAWING

FIG. 4 is a section view taken along the line 4—4 of FIG. 2; and

FIG. 5 is a perspective view of the lower strut support member.

DESCRIPTION OF THE PREFERRED EMBODIMENT

Figure 1:
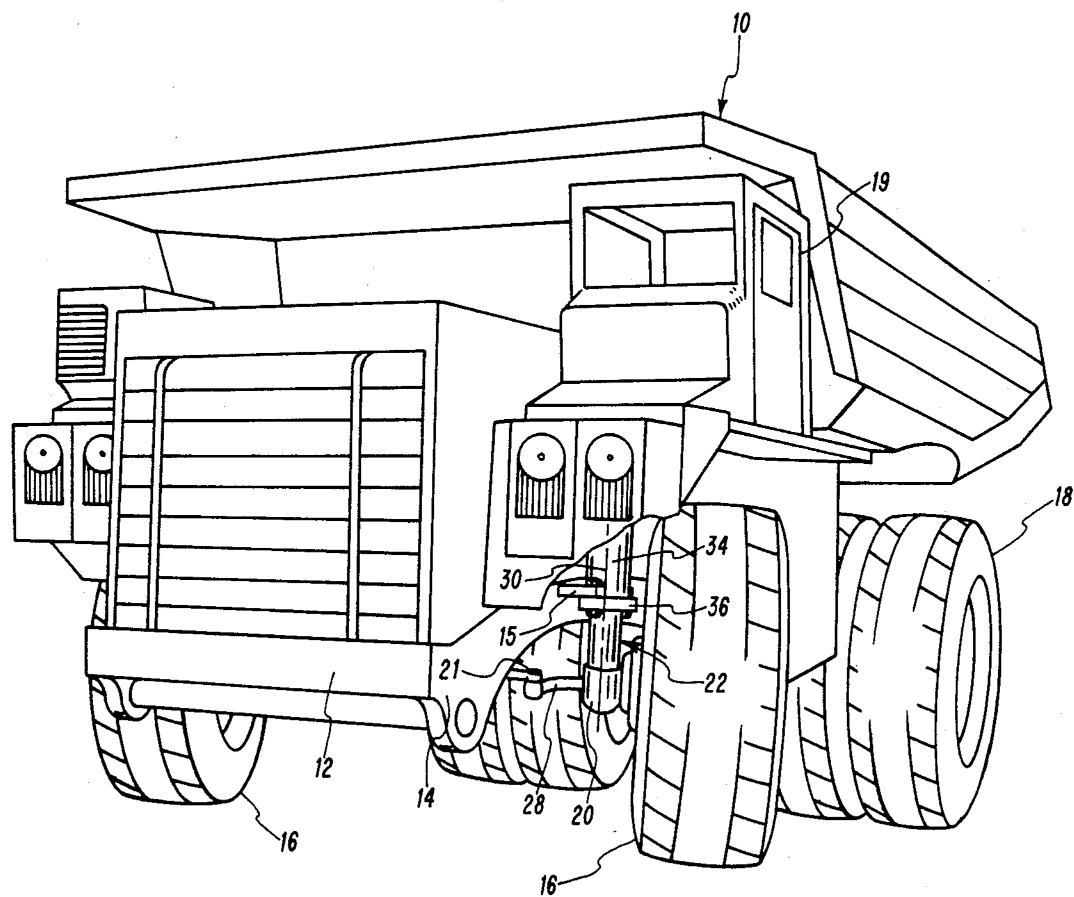
FIG. 1 is a perspective view of an off highway wheeled motor truck including the suspension strut arrangement of the present invention.

In the description which follows like parts are marked throughout the specification and drawing with the same reference numerals, respectively. The drawing figures are not necessarily to scale and certain features of the invention may be shown exaggerated in scale in the interest of clarity.

Referring to FIG. 1, there is illustrated a vehicle, generally designated by the numeral 10 comprising an off highway ore hauling truck of a type which is particularly suited for a high capacity hydraulic type suspension strut in accordance with the present invention. The truck 10 includes a frame 12 characterized by a frame member 14 for supporting steerable front wheels 16. The truck 10 also includes dual rear wheels 18, one set shown, which may be supported by suspension struts generally of the type described in my co-pending U.S. patent application Ser. No. 550,883, filed: Nov. 9, 1983. Each of the front wheels 16 is adapted to be supported by a steerable spindle support 20, one shown, said spindle supports being connected to suitable steering linkage 21 whereby the wheels 16 may be suitably steered by an operator in the cab 19 of the vehicle 10.

Figure 2:
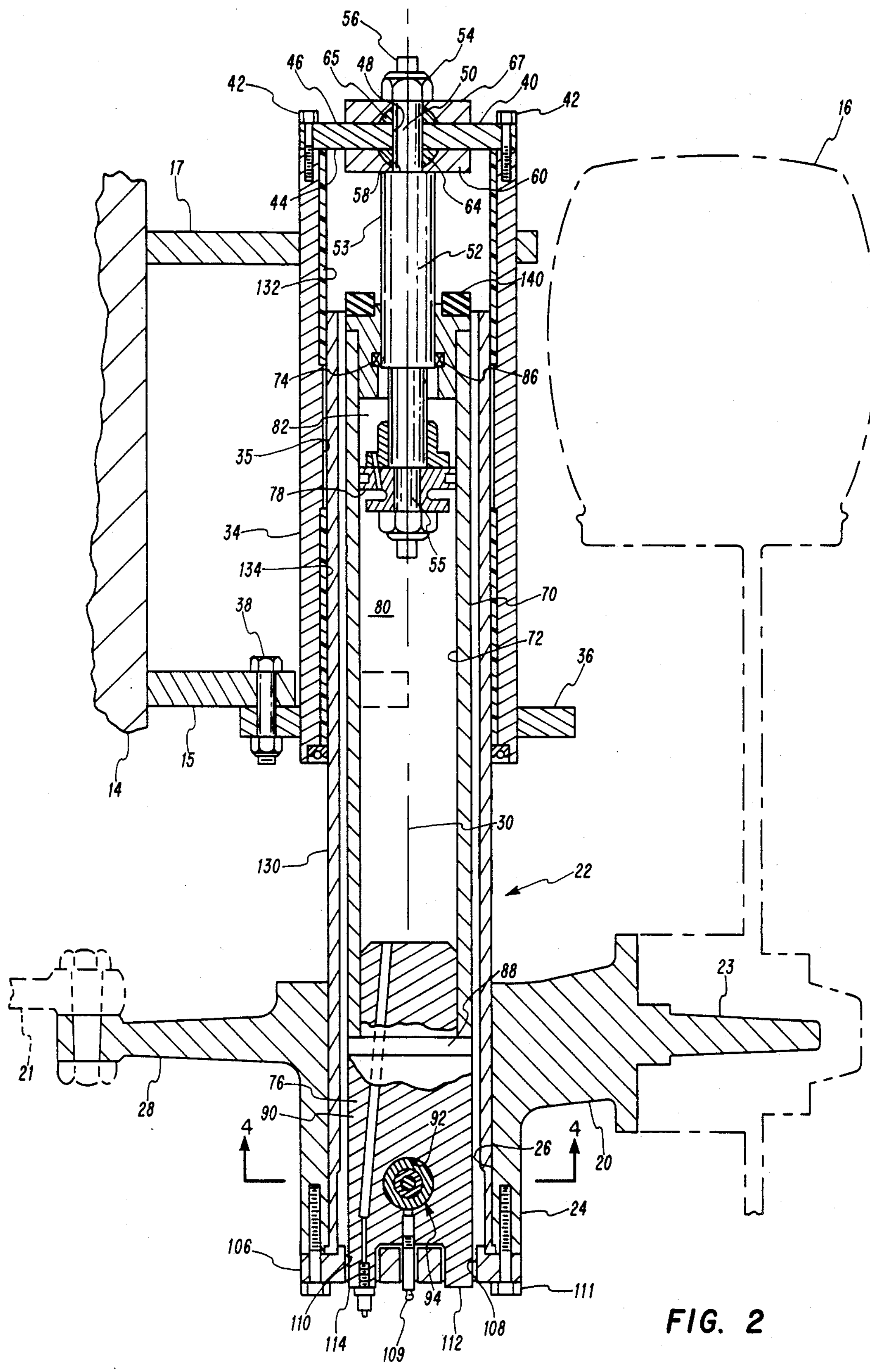
FIG. 2 is a longitudinal central section view of the suspension strut for one of the steerable wheel spindles of the truck illustrated in FIG. 1.

Referring now to FIG. 2, in particular, there is illustrated a vertical section view of the suspension strut arrangement for the spindle support 20. Each of the spindle supports 20 is supported in an identical manner by an improved suspension strut generally designed by the numeral 22. As shown in FIG. 2, the spindle support 20 includes a spindle 23 for supporting wheel 16 in a conventional manner. The spindle support 20 also includes a body portion 24 integral with spindle 23 and having a bore 26 formed therethrough. A steering arm 28 extends from the body portion 24 for connection to the aforementioned steering linkage 21. The spindle support 20 is supported by the suspension strut 22 for pivotal movement about a central generally vertical axis 30 with respect to the frame member 14, a portion of which is illustrated in FIG. 2 and comprises a laterally projecting plate 15. The configuration of the frame 12 and its specific form of connection to the suspension strut 22 in the illustrated figures is unique but various other specific arrangements of frame structure may be provided without departing from the scope and spirit of the invention described and claimed herein.

In the exemplary arrangement, the frame 12 is connected to the suspension strut 22 through a generally elongated cylindrical tube member 34 having a radially extending flange portion 36 at its lower end and adapted to be secured to the frame plate 15 through conventional threaded bolt assemblies 38, one shown. The tube member 34 is also preferably secured further to the frame member 14 through a suitable connecting member 17. The tube member 34 includes a removable upper head member 40 formed as a generally cylindrical plate which may be removably secured to the tube member 34 by bolts 42. The plate 40 includes opposed flat surfaces 44 and 46 and a central bore 48. The upper end 50 of an elongated piston rod 52 extends through the bore 48 and is threadedly engaged with a retaining nut 54 at its upper end. Suitable wrench flats 56 may be provided on the distal end of the piston rod portion 50 for holding the rod while the nut 54 is secured thereto.

Figure 3:
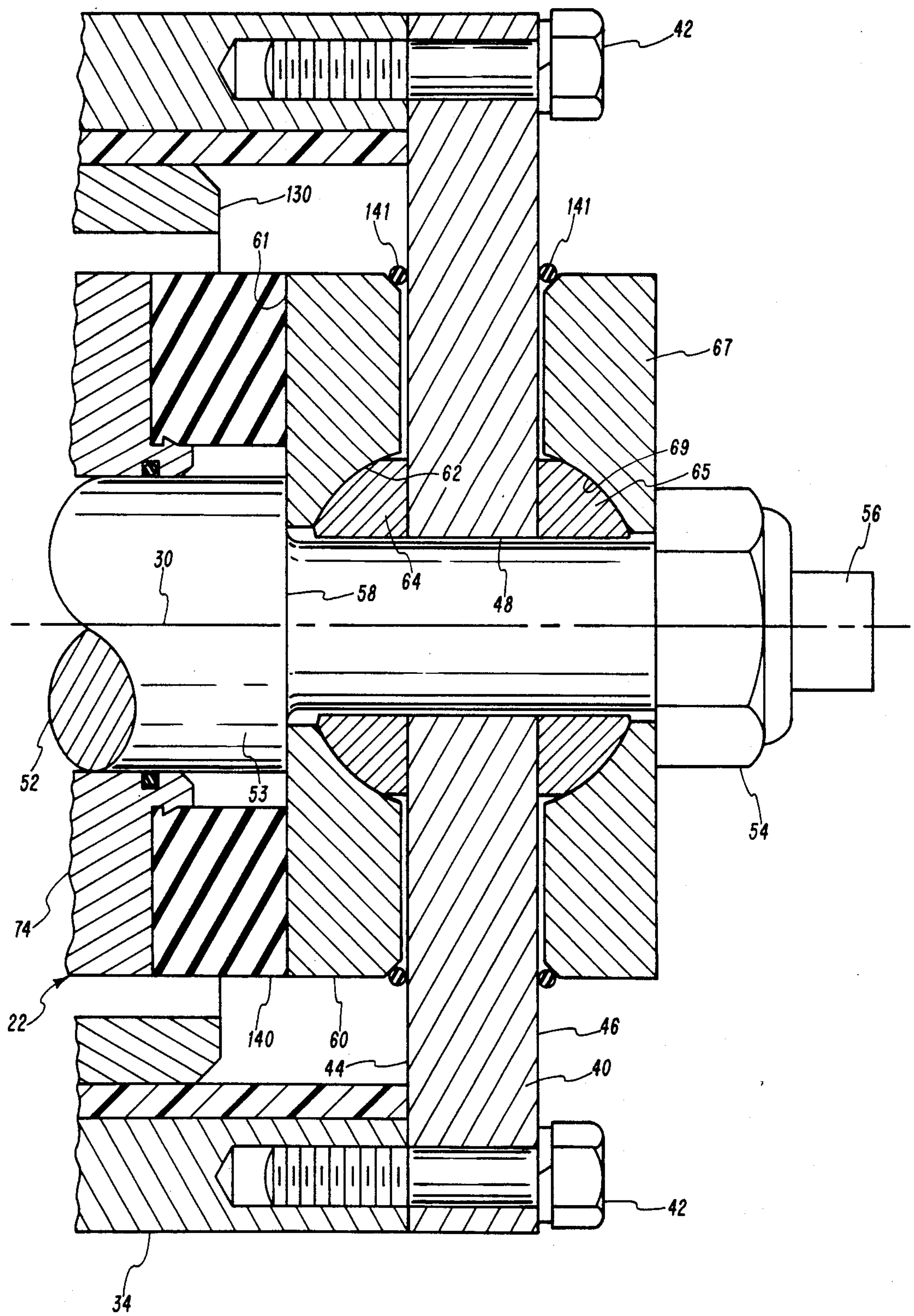
FIG. 3 is a detail central section view of the upper support bearing arrangement of the suspension strut and shown on a larger scale.

A transverse shoulder 58 is formed at the juncture of the reduced diameter portion 50 with a larger-diameter part 53 of the piston rod 52 and is engageable with a lower cylinder bearing plate 60 having a generally concave spherical bearing surface 62 formed thereon, see FIG. 3, for engagement with a somewhat hemispherical shaped bearing segment 64 journalled on ths piston rod portion 50 and engageable with the bearing plate surface 44 and the bearing surface 62. A second bearing member 65, similar to the member 64, is engaged with the plate surface 46, is also journalled by the piston rod portion 50 and is engageable with a second cylindrical bearing plate 67 secured in assembly with the piston rod 52 and the bearing plate 40 by the locknut 54. The bearing plate 67 includes a concave spherical bearing surface 69 engageable by the bearing member 65.

Referring primarily to FIG. 2, the suspension strut 22 includes an elongated cylinder member 70 having a bore 72, an upper head member 74 removably secured to the cylindrical member 70 and a lower head member 76 also removably secured to the cylinder 70. A piston 78 is disposed in the bore 72 and divides the bore into opposed chambers 80 and 82. The piston 78 is secured to the lower end 55 of the piston rod 52 and the rod 52 also extends through the head 74. Seal means 86 is provided in the head 74 to prevent escape of pressure fluid from the chamber 82 between the piston rod 52 and the head 74.

The suspension strut 22 may include suitable structure associated with the piston 78 and the rod 52 for controlling the flow of pressure fluid such as a compressible silicone fluid or the like between the chambers 80 and 82 wherein the suspension strut 22 functions as a hydraulic spring for supporting at least a portion of the frame 12 with respect to the spindle support 20 and wheel 16. A detailed description of the structure for valving or controlling the flow of liquid between the chambers 80 and 82 are not believed to be necessary to an understanding of the present invention. Suffice it to say that the chamber 80 is filled with a predetermined quantity of compressible liquid which provides a predetermined position of the piston 78 within the bore 72 under the normal static loads imposed on the suspension strut 22 by the frame 12. When a change in load is imposed on the support tube member 34, the piston 78 may tend to extend downwardly into the chamber 80 compressing the fluid trapped therein, some of which will flow into the chamber 82 until a force balance occurs across the opposed faces of piston 78. When the spindle support 20 undergoes excursion due to irregularities in the roadway over which the vehicle 10 is traversing, the cylinder 70 may oscillate along the axis 30 relative to the piston 78 and rod 52 to permit absorption and damping of road shocks from being transmitted to the vehicle frame 12.

In the particular embodiment of the suspension arrangement illustrated in FIGS. 2, 4 and 5, the lower head member 76 includes a transverse cylindrical flange 88 and a central downwardly projecting flatsided boss 90 having a transverse bore 92 for supporting a self aligning bearing assembly 94. The self aligning bearing assembly 94 is characterized by an outer cylindrical member 96 having an inner surface 97 engaged with a somewhat spherical shaped inner member 98. The bearing member 98 is mounted on a cylindrical bearing pin 100 which extends between and is supported in opposed yoke arms 102 and 104 of a lower spindle support plate 106. The support plate 106 includes suitable openings 108 and 110, FIGS. 2 and 5, through which project opposed lower extensions 112 and 114 of the boss 90. The pin 100 is journalled in respective bores 101 and 103 of the yoke arms 102 and 104 and is secured thereto by a bolt assembly 116 and a retainer plate 118. A cylindrical collar portion 107 of the pin 100 is engageable with the bearing member 98 whereby longitudinal excursion of the pin 100 along its own axis is precluded. The plate 106 is secured to the body 24 by bolts 111.

In the arrangement of the suspension strut 22 illustrated, a tubular support sleeve 130 is provided and is secured in the bore 26 in spaced relationship to the cylinder 70 by the support plate 106 and extends upward into the tube member 34 in load bearing engagement therewith. The tube member 34 is provided with a longitudinal bore 35 and suitable sleeve bearing inserts 132 and 134 retained therein and in supportive relationship to the sleeve 130. Those skilled in the art will appreciate that the cylinder 70 may be directly connected to the spindle body 24 and be in load bearing enggement with the frame tube member 34 or a modified version thereof. However, in the arrangement illustrated the cylinder 70 advantageously is not subjected to substantial bending loads but is only stressed in compression and tension along the axis 30. Thanks to the self aligning bearing arrangement between the lower end of the cylinder 70 as provided between the head member 76 and the spindle support plate 106 the cylinder 70 is not subjected to substantial bending loads and misalignment between the cylinder 70 and the sleeve 130 may be tolerated to a large degree without imposing bending loads on the seal assembly 86 or the piston rod 52 through the cylinder 70.

Referring to FIGS. 2 and 3, the upper surface of the head member 74 is provided with a bumper or shock absorbing pad 140 made of a suitable elastomeric material and suitably secured to the head member 74 by fastener means, not shown. In the event of incursion of severe road shocks or the collapse of the suspension strut 22 the pad 140 will engage surface 61 of the lower bearing plate 60, as shown in FIG. 3, and, in the latter circumstance, the entire weight imposed by the frame 12 on the spindle support 20 will be transmitted between the lower bearing plate 60 and the pad 140 to the cylinder 70. However, thanks to the arrangement of the spherical bearing members 64 and 65 and the opposed bearing plates 60 and 67, in the event of collapse of the piston 78 into the cylinder 70 until the pad 140 engages the surface 61 the spindle support 20 may still be easily rotated about the axis 30 since the lower bearing member 64 will still transit bearing loads between the lower bearing plate 60 through the bearing member 64 to the plate 40. Thus, the spindle support 20 may be easily turned to provide for steering of the vehicle wheels 16.

Of course, during normal operation of the strut 22 loads are transmitted from the spindle support 20 through the plate 106, the bearing assembly 94 to the cylinder 70 and through the fluid medium in the chamber 80 to the piston 78, the rod 52 and the bearing plate 60, and through the bearing member 64 to the plate 40. In the event of extension of the piston rod 52 with respect to the cylinder 70 or a tendency for the cylinder 70 to extend out of the support member 34 the rod 52 will be subjected to a tension load which will be transmitted across the bearing formed by the upper bearing plate 67 and spherical bearing member 65 to the frame 12 through the plate 40 and the member 34.

The clearance spaces between the bearing plates 60 and 67 and the respective surfaces 44 and 46 are sealed by resilient o-ring seals 141. The bearing arrangement illustrated in FIG. 3 may be packed with grease at assembly or the bearing members 60, 64, 65 and 67 may be made of suitable self lubricating materials. The lower bearing assembly 94 may be lubricated through a fitting 109, FIG. 2, secured to the boss 90. Conventional engineering materials are otherwise used for the structure described herein.

It will be appreciated from the foregoing description thata particularly unique suspension strut is provided in accordance with the present invention wherein a steerable wheel spindle is supported directly by a hydraulic suspension strut in which a compressible hydrualic fluid is entrapped to provide the spring function and shock absorbing function and wherein a unique upper and lower bearing arrangement is provided for supporting turning and misalignment loads imposed on the suspension strut during normal operation and in the event of total collapse of the suspension strut piston within the strut cylinder.

Although a preferred embodiment of the invention has been described in detail herein those skilled in the art will recognize that various substitutions and modifications may be made to the specific embodiment without departing from the scope and spirit of the invention as recited in the appended claims.

What I claim is:

1. A suspension arrangement for a wheel support of a vehicle, said vehicle having a frame and at least one wheel support means rotatable relative to said frame, said suspension arrangement comprising:

a pressure fluid suspension strut including a cylinder and a piston reciprocably disposed in said cylinder and forming a fluid chamber in said cylinder, said cylinder and piston operably interconnecting said frame and said wheel support means; and bearing means forming a connection between one of said cylinder and piston and one of said frame and said wheel support means for supporting said suspension strut for rotation of said wheel support means relative to said frame when said suspension strut is in an operative position and between other of said cylinder and piston and said one of said frame and said wheel support means for supporting said suspension strut for rotation of said wheel support means relative to said frame when said suspension strut is in collapsed position of said cylinder and piston, respectively.

2. The suspension arrangement set forth in claim 1 wherein:

said bearing means comprises first and second cooperating bearing members interposed between said frame and one of said cylinder and piston, one of said bearing members being engaged by a piston rod connected to said piston in an operative condition of said suspension strut, said one bearing member being engaged by said cylinder in a collapsed condition of said piston into said cylinder to transit bearing loads to said frame through the other bearing member.

3. The suspension arrangement set forth in claim 2 wherein:

said frame includes a support plate, said piston rod extending through said support plate and being connected to a third bearing member engageable with a fourth bearing member interposed between said support plate and said third bearing member for transmitting forces between said suspension strut and said frame when a load interacting between said wheel support means and said frame tends to extend said piston rod from said cylinder.

4. The suspension arrangement set forth in claim 3 wherein:

said bearing members include cooperating spherical bearing surfaces for allowing excursion of the central longitudinal axis of said strut relative to said frame.

5. The suspension arrangement set forth in claim 2 including:

resilient bearing pad means on said cylidner and engageable with one of said first and second bearing members.

6. The suspension arrangement set forth in claim 1 including:

self aligning bearing means forming a connection between the other of said cylinder and said piston and the other of said wheel support means and said frame to minimize the imposition of lateral bending loads on said suspension strut.

7. The suspension arrangement set forth in claim 6 including:

cooperating bearing members on said frame and said wheel support means for supporting said wheel support means for rotation with respect to said frame.

8. The suspension arrangement set forth in claim 7 wherein:

said cooperating bearing members comprise a cylindrical tube and a sleeve disposed in telescoping relationship with each other and disposed around said suspension strut.

9. The suspension arrangement set forth in claim 8 wherein:

said tube is secured to said frame and includes a transverse end plate portion at one end of said tube supporting said bearing means between said one of said cylinder and piston and said frame.

10. The suspension arrangement set forth in claim 9 wherein:

said sleeve is disposed in said tube in telescoping relationship thereto and is secured at one end to said wheel support means.

11. In a wheeled vehicle including a frame and a steerable wheel support, a suspension strut interconnecting said wheel support and said frame for supporting said frame relative to said wheel support and forming a connection between said wheel support and said frame, said suspension strut including a cylinder and a piston in assembly and forming fluid chamber means in said cylinder, said chamber means being filled with a compressible hydraulic fluid to provide a resilient load bearing means interconnecting said suspension strut with said frame and said wheel support;

support means for supporting said suspension strut to provide for rotation of said wheel support relative to said frame substantially about the longitudinal axis of said cylinder and piston assembly, said support means comprising cooperating tubular bearing members on said frame and said wheel support and including a cylindrical tube and a sleeve disposed in telescoping relationship with each other and disposed around said suspension strut; and first and second cooperating bearing members interposed between said frame and one of said cylinder and piston, one of said first and second bearing members being engaged by a piston rod connected to said piston in an operative condition of said suspension strut, said one bearing member being engaged by said cylinder in an inoperative collapsed condition of said piston into said cylinder to transmit bearing loads to said frame through the other of said first and second bearing members.

12. The combination set forth in claim 11 wherein:

said frame includes a support plate secured to an upper end of said tube, said piston rod extending through said support plate and being connected to a third bearing member engageable with a fourth bearing member interposed between said support plate and said third bearing member for transmitting forces between said suspension strut and said frame when a load interacting between said wheel support means and said frame tends to extend said piston rod from said cylinder.

13. A suspensions arrangement for a wheel support of a vehicle, said vehicle having a frame and at least one wheel support means rotatable relative to said frame, said suspension arrangement comprising;

a suspension strut including first and second members operably interconnecting said frame and said wheel support means; and bearing means forming a connection between said suspension strut and one of said frame and said wheel support means for supporting said suspension strut for rotation of said wheel support means relative to said frame when said suspension strut is in an operative position and a collapsed position, of said first and second members, respectively;

said bearing means comprising cooperating bearing members interposed between said frame and said suspension strut, one of said bearing members being engaged by said first member in an operative condition of said suspension strut, said one bearing member being engaged by said second member in an inoperative collapsed condition of said first and second members to transmit bearing loads to said frame through the other bearing member.

14. The suspension strut set forth in claim 13 wherein:

said frame includes a support plate, said first member extending through said support plate and being connected to bearing means interposed between said support plate and said first member for transmitting forces between said suspension strut and said frame when a load interacting between said wheel support means and said frame tends to extend said first member relative to said second member in a direction opposite the collapsed position of said first and second members.

15. A suspension strut assembly for a wheel support of a vehicle, said vehicle having a frame and at least one wheel support means rotatable relative to said frame, said suspension strut assembly comprising:

a pressure fluid suspension strut including a cylinder and a positon reciprocably disposed in said cylinder and forming a fluid chamber in said cylinder, said cylinder and piston operably interconnecting said frame and said wheel support means;

first bearing means forming a connection between said cylinder and one of said frame and said wheel support means, a piston rod extending from said cylinder and connected to second bearing means between the other of said frame and said wheel support means, at least one of said bearing means providing for supporting said suspension strut for rotation of said wheel support means relative to said frame when said suspension strut is in an operative position and an inoperative collapsed position of said cylinder and piston, respectively.

* * * * *